United States Patent [19]

Dunn et al.

[11] 4,286,583

[45] Sep. 1, 1981

[54] SOLAR HEATER UNIT

[75] Inventors: David C. Dunn, Santee; George C. Tweed, Jr., La Mesa, both of Calif.

[73] Assignee: U.S. Elevator Corporation, Spring Valley, Calif.

[21] Appl. No.: 53,997

[22] Filed: Jul. 2, 1979

[51] Int. Cl.³ .............................. F24J 3/02; F28F 9/02
[52] U.S. Cl. .................................. 126/445; 126/448; 126/449; 165/170; 165/175
[58] Field of Search ............... 126/444, 445, 451, 446, 126/447, 448, 449; 165/168, 170, 173, 175, 176

[56] References Cited

U.S. PATENT DOCUMENTS

| 4,007,728 | 2/1977 | Guba | 126/445 |
| 4,056,090 | 11/1977 | Henriques et al. | 126/444 |
| 4,062,350 | 12/1977 | Reed | 126/444 |
| 4,098,019 | 7/1978 | Strong | 126/451 |
| 4,125,109 | 11/1978 | Erwin | 126/451 |
| 4,191,169 | 3/1980 | Hyman | 126/444 |
| 4,201,195 | 5/1980 | Sakhuja | 126/444 |
| 4,203,421 | 5/1980 | Bencic | 126/444 |

FOREIGN PATENT DOCUMENTS 2646174  4/1977  Fed. Rep. of Germany ........... 126/444

Primary Examiner—Daniel J. O'Connor
Attorney, Agent, or Firm—Brown & Martin

[57] ABSTRACT

A solar heating unit having a thin metal sheet with multiple parallel ribs pressed into the sheet to form fluid conducting channels. The channeled sheet is sealed to a rigid backing panel, to which are secured inlet and outlet pipes extending across the opposite ends of the channels, with slots through the pipes and backing panel to communicate with all of the channels at each end. The assembly is mounted in an insulated housing with the channeled metal sheet exposed, and is enclosed by a transparent glazing panel or window.

2 Claims, 7 Drawing Figures

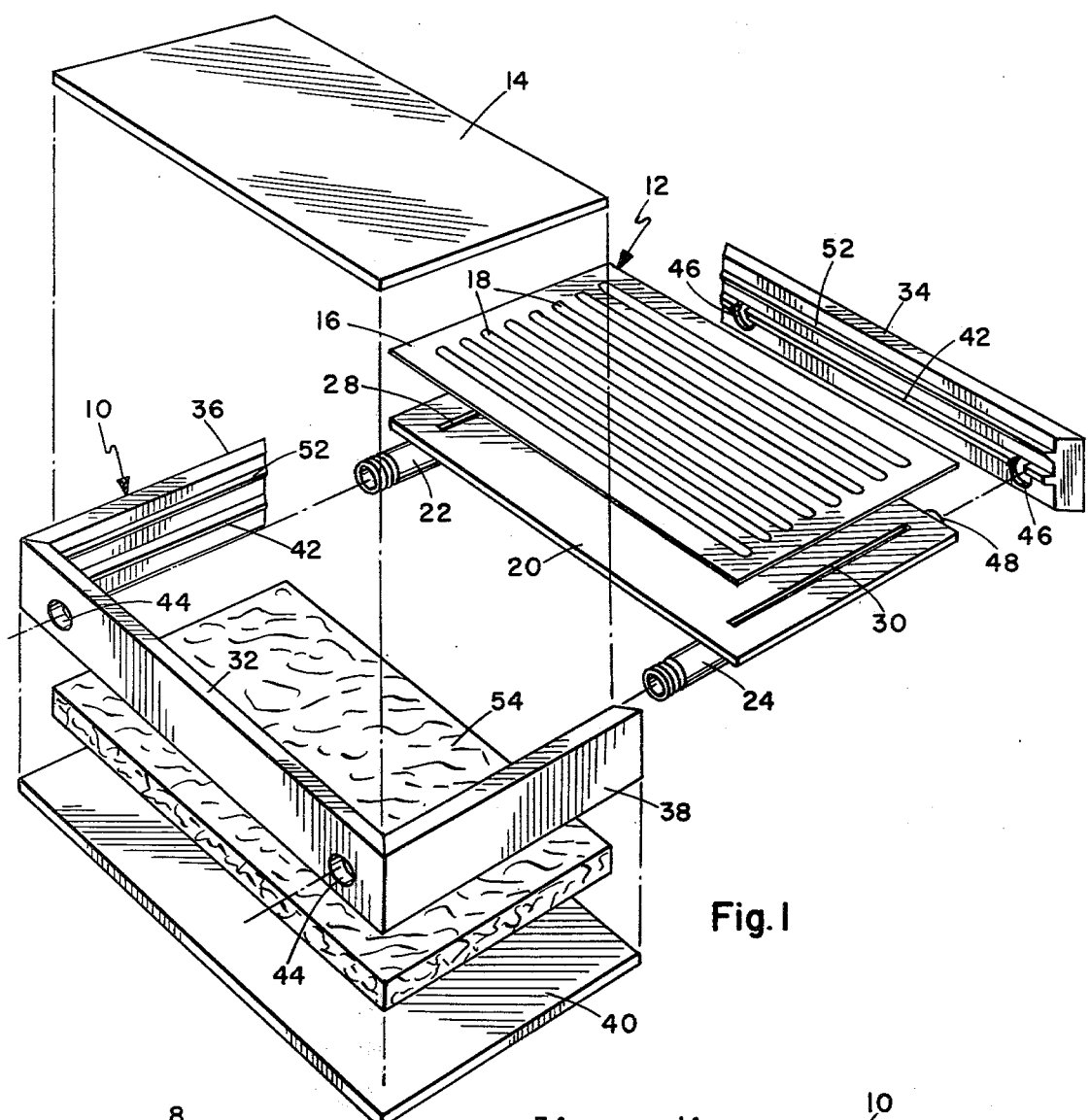
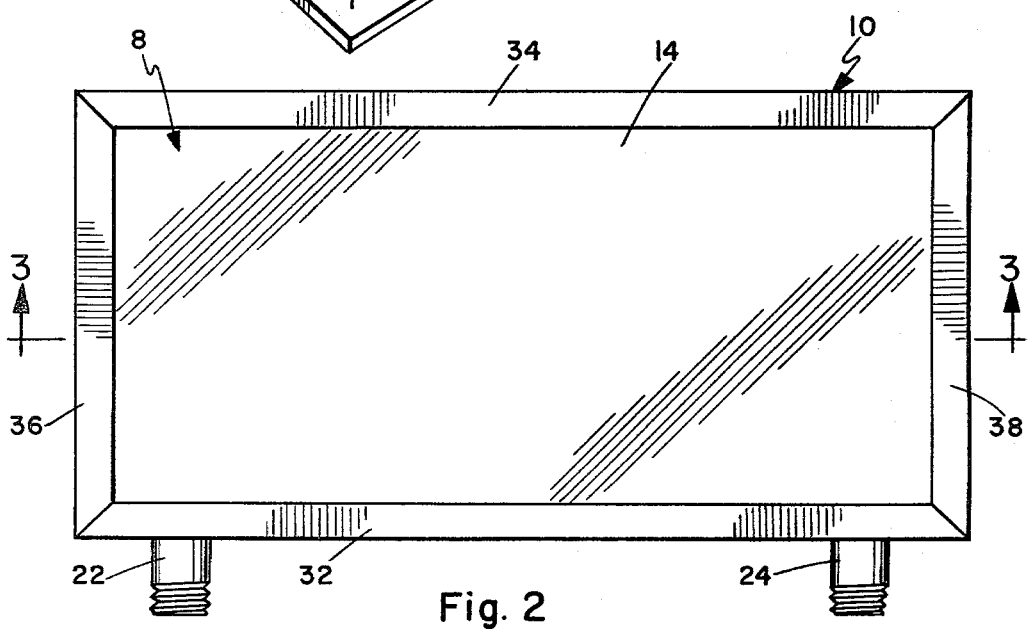

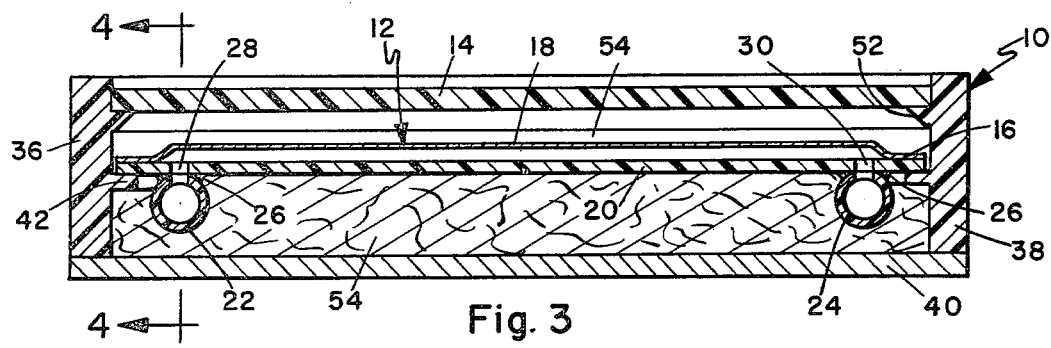
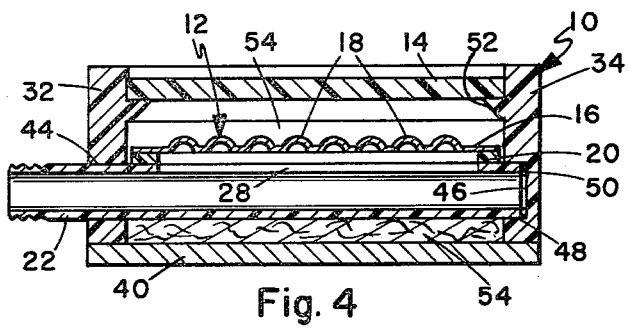 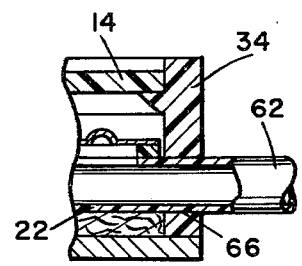
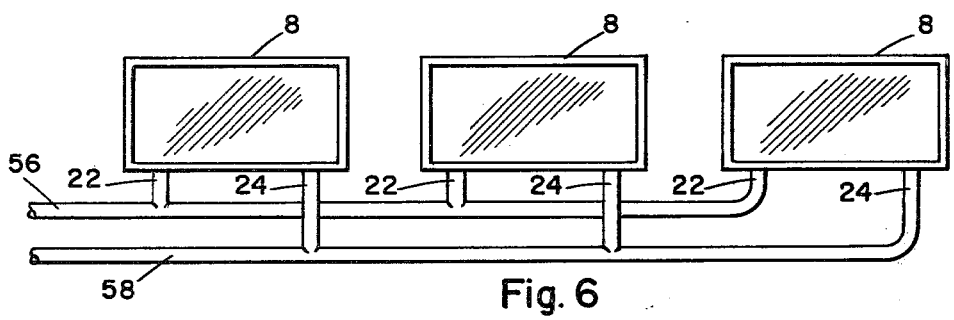
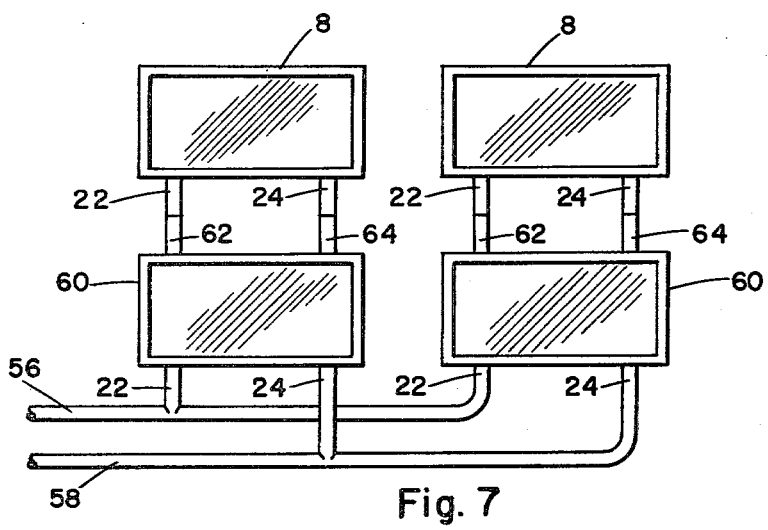

SOLAR HEATER UNIT

BACKGROUND OF THE INVENTION

In solar heating apparatus in which heat absorbing fluid is conducted through tubes or channels, there are many ways of feeding the fluid into and out of the channels. The channel can be in the form of a single serpentine channel for maximum exposure of the fluid to solar heating, but this arrangement has the disadvantage of low flow rate. For maximum flow rate the fluid is conducted simultaneously through multiple tubes between an inlet manifold and an outlet manifold. This type of structure is usually made by connecting small tubes between two larger manifold tubes, which requires a large number of joints to be fitted and sealed. A considerable amount of labor is involved and the cost is high.

SUMMARY OF THE INVENTION

The solar heating unit described herein has multiple channels extending between manifolds for maximum flow, but is constructed in a very simple and economical manner. The channels are formed by pressing parallel ribs into a thin sheet of metal to form a channel plate, which is then sealed to one side of a rigid backing panel by adhesive or similar means. Fixed to the other side of the backing panel are an inlet pipe and an outlet pipe, extending across opposite ends perpendicular to the channels. The pipes have elongated slots which extend through the backing panel to connect the pipes with all of the channels at opposite ends. The backing panel and pipes can be of plastic material assembled by adhesive, which is simple and provides a good seal.

The completed fluid conducting assembly is mounted in a housing which is insulated to minimize heat loss, the metal channel plate being exposed in the upper portion of the housing. A transparent glazing panel or window is secured in the housing above the channel plate for protection and to trap the heat after solar radiation has passed through the window.

The pipes extend through one or both sides of the housing so that multiple units can be interconnected by suitable piping to obtain the required heating capacity. Each unit is self-contained and can be mounted or installed on or in a variety of structures.

The primary object of this invention, therefore, is to provide a new and improved solar heating unit.

Another object of this invention is to provide a solar heating unit having multiple fluid conducting channels with manifold type inlet and outlet, but without the necessity for a large number of individual connections.

Another object of this invention is to provide a solar heating unit which is very simple to construct and assemble.

A further object of this invention is to provide a solar heating unit which is self-contained but is readily interconnected in multiple unit assemblies.

Other objects and advantages will be apparent in the following detailed description, taken in conjunction with the accompanying drawings, in which:

FIG. 1 is an exploded perspective view of the solar heating unit.

FIG. 2 is an enlarged top plan view of the assembled unit.

FIG. 3 is a sectional view taken on line 3—3 of FIG. 2.

FIG. 4 is a sectional view taken on line 4—4 of FIG. 3.

FIG. 4 is a sectional view similar to a portion of FIG. 4, showing the pipes extending through the housing for series interconnection of units.

FIG. 6 illustrates a parallel interconnection of three units.

FIG. 7 illustrates a series parallel interconnection of four units.

DESCRIPTION OF THE PREFERRED EMBODIMENTS

The solar heating unit 8 comprises a housing 10 in which the heater panel 12 is mounted and is enclosed by a transparent window 14. As illustrated, the unit is of rectangular configuration and can be made in a variety of sizes and length to width proportions.

The heater panel 12 includes a channel plate 16 having a plurality of spaced parallel closed end channels 18 extending longitudinally and terminating adjacent opposite ends of the plate. The channel plate is of thin sheet metal, such as copper, and the channels are formed by pressing ribs into the metal in a simple die. Channel plate 16 is secured to one face of a rigid backing panel 20 by adhesive, or other such means, to seal the two elements together and enclose the channels. Fixed to the other face of the backing panel 20 are an inlet pipe 22 and an outlet pipe 24, extending across the opposite ends of the backing panel perpendicular to channels 18. It should be noted that the flow can be in either direction, the terms inlet and outlet being used for convenience of description.

The backing panel and the pipes are preferably of plastic material and the pipes are secured by fillets 26 of adhesive or suitable sealing compound, as in FIG. 3. Inlet pipe 22 has a longitudinal inlet slot 28 which extends through the backing panel 20 to communicate with the channels 18 at one end. Outlet pipe 24 has a similar outlet slot 30 extending through the backing panel to communicate with the channels 18 at the other end.

Housing 10 is a simple open topped box structure with side walls 32 and 34, end walls 36 and 38 and a bottom panel 40, secured together in any suitable manner. The structure may be of wood, plastic or composite material with good thermal insulating properties. Spaced above the bottom panel 40 is an inwardly projecting support flange 42 extending peripherally around the side and end walls. Heater panel 12 rests on the support flange 42, with the inlet and outlet pipes projecting through holes 44 in side wall 32. The side wall 34 has sockets 46 in which the stub ends 48 of pipes 22 and 24 are seated, and are sealed by suitable sealing compound 50, as in FIG. 4. The flow path is thus in through inlet pipe 22, through inlet slot 28 to channels 18, along the channels to outlet slot 30 and out of the outlet pipe 24.

Spaced above flange 42 is a support rib 52 extending around the walls to support the window 14. Solar radiation passing through window 14 is converted to heat on striking the heater panel 12 and is trapped in the chamber 54 between the window and the heater panel.

To improve the insulation of the housing a thermal insulating blanket 54 of fiber material, or other such insulation, is installed between the heater panel 12 and bottom panel 40.

The heater unit 8 is self-contained and a single unit may be connected to any suitable source of fluid to be heated, such as water. The unit as described thus far is adapted for multiple connection in parallel, as in FIG. 6. In this system the inlet pipe 22 of each unit is connected to a common supply pipe 56, and the outlet pipe 24 of each unit is connected to a common return pipe 58.

If it is desired to connect units in series, as in FIG. 7, the only change required to make the modified heater unit 60 is illustrated in FIG. 5. Instead of having stub ends sealed in sockets, the inlet and outlet pipes 22 and 24 have extensions 62 and 64, respectively, which project through holes 66 in side wall 34. These extensions 62 and 64 are then connected respectively to the inlet and outlet pipes 22 and 24 of the next unit in series.

The heater unit is thus a very simple unit with a minimum of parts and can be assembled quickly without special tools or jigs. The cost is considerably less than that of other units of comparable efficiency.

Having described our invention, we now claim:

1. A solar heating unit, comprising:
    a heater panel having a backing panel;
    a channel plate sealed to one face of said backing panel, the channel plate having a plurality of spaced channels formed therein and extending between opposite ends, the channels having closed ends adjacent the opposite ends of the channel plate;
    said backing panel having elongated slots therethrough extending perpendicularly to the channels at opposite ends and interconnecting the channels at their closed ends;
    an inlet pipe longitudinally sealed to the backing panel along one of said slots and an outlet pipe longitudinally sealed to the backing panel along the other of said slots, said inlet and outlet pipes each having a longitudinal slot communicating with the respective slot in the backing panel and connecting each pipe to all of the channels;
    a housing having side walls surrounding the heater panel;
    said inlet and outlet pipes having end portions projecting through one of said side walls;
    the wall opposite thereto having closed sockets in which the other ends of said inlet and outlet pipes are seated and sealed.

2. A solar heating unit according to claim 1 wherein said inlet and outlet pipes each project from opposite sides of the housing.

* * * * *